United States Patent
La Montagne

[15] 3,673,726
[45] July 4, 1972

[54] FISH LURE

[72] Inventor: Joseph W. La Montagne, 121 East Marceau Street, St. Louis, Mo. 63111

[22] Filed: June 24, 1970

[21] Appl. No.: 49,275

[52] U.S. Cl..........................43/42.11, 43/42.31, 43/42.39, 43/44.9
[51] Int. Cl. .......................................................A01k 85/00
[58] Field of Search ................43/42.11, 42.31, 44.9, 44.91

[56] References Cited

UNITED STATES PATENTS

| | | | |
|---|---|---|---|
| 2,387,255 | 10/1945 | Godlewski | 43/42.31 X |
| 2,223,823 | 12/1940 | Hampton | 43/44.9 X |
| 2,910,798 | 11/1959 | Bias | 43/44.9 X |
| 3,500,573 | 3/1970 | Hudson | 43/42.11 |

FOREIGN PATENTS OR APPLICATIONS

| | | | |
|---|---|---|---|
| 1,120,300 | 4/1956 | France | 43/44.91 |
| 1,116,033 | 2/1934 | Australia | 43/44.9 |

Primary Examiner—Samuel Koren
Assistant Examiner—Daniel J. Leach
Attorney—Charles B. Haverstock

[57] ABSTRACT

A fish lure having one or more body portions constructed of a relatively light buoyant substance and having a cup-shaped member on the forward end thereof and a hook portion on the rearward end. The subject lure is designed and constructed to produce a jerky action when moving through and/or over the water, and is particularly designed to be used simultaneously with another, usually heavier lure, which enables it to be cast to a considerable distance and yet retains its action characteristics as a very lightweight lure.

8 Claims, 7 Drawing Figures

PATENTED JUL 4 1972

3,673,726

INVENTOR:
JOSEPH W. LA MONTAGNE

BY Charles B. Haverstock
ATTORNEY.

FISH LURE

Many different kinds of fish lures have been designed and constructed for various purposes and to attract different kinds of fish. However, so far as known, none of the known lures are designed particularly to be used simultaneously with another heavier lure to facilitate casting to any desired distance and yet will land relatively softly on the water some distance from the lure with which it is used in order to achieve a lightweight action. Furthermore, no one heretofore has devised a lure, such as the present lure, which can be constructed in single or multiple lure units and which produces the same kind of jerky and/or popping action when moving through the water to attract fish. The present lure therefore adds flexibility and versatility to a fisherman's equipment and substantially increases the chances for catching fish.

It is a principal object of the present invention to provide a new style of lure which is particularly suitable for simultaneous use with other, usually heavier, lures in order to provide a different action.

Another object is to improve the chances of catching fish by providing a way to combine lures.

Another object is to provide an extremely lightweight lure which produces relatively little disturbance or splash when landing on the surface of water.

Another object is to provide a lure which has an attractive action when moving over or through water.

Another object is to provide a relatively lightweight lure which can be constructed to have one or more similar lure portions connected together as a unit.

Another object is to obtain the advantages of the action of a lightweight lure in a lure which is designed to be cast at relatively great distances.

Another object is to provide a relatively inexpensive and easy to construct lure which substantially increases the flexibility and versatility of a fisherman's equipment.

Another object is to substantially expand the number of possible lures and lure combinations available to fishermen.

These and other objects and advantages of the present invention will become apparent after considering the following detailed specification in conjunction with the accompanying drawing, wherein.

Figure 1:
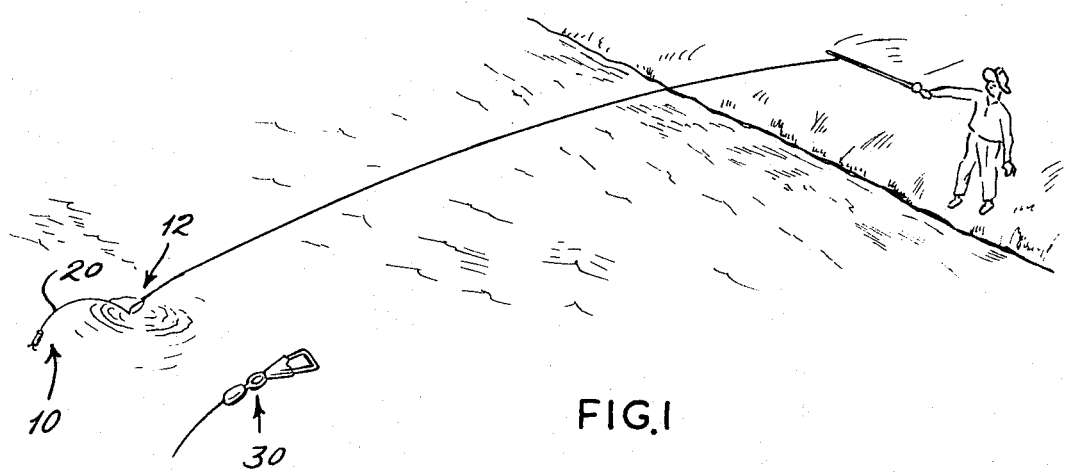
FIG. 1 shows a fisherman in the process of casting a more or less conventional lure which has attached to it a secondary lure constructed according to the present invention.

Referring to the drawing more particularly by reference numbers, number 10 identifies a lure constructed according to the present invention. The lure 10 is designed to be relatively lightweight and in most cases will be too lightweight by itself to be cast any great distance. However, by being lightweight, the present lure will, when it lands on the surface of the water after being cast, make a minimum of disturbance of the water, whereby it simulates the action of certain bugs and insects which light on the water surface and are attractive to fish. Also, because the subject lure is preferably lightweight, and yet may be fairly large as lures go, it is designed mainly to be used in conjunction with another, preferably heavier, lure which will provide the weight necessary to enable the fisherman to cast to great distances. The present lure will usually be connected to the heavier lure at a suitable distance by a length of line so that when the heavier lure is cast the present lure will more or less follow it through the air, and only after the heavier lure has landed in the water will the present lure land and then at some distance therefrom as determined by the length of line between the two lures. Also the present lure will land on the water much more gently than the heavier lure, and, as stated, it will land after the heavier lure has landed due to the fact that it will still be fairly high in the air at the time the heavier lure strikes the water. The speed of the subject lure will also be substantially reduced once the heavier lure strikes the water and is no longer dragging it along through the air. This is illustrated in FIG. 1 where a heavier lure 12 is shown having landed in the water while the subject lure 10 is still moving through the air.

Figures 2, 3:
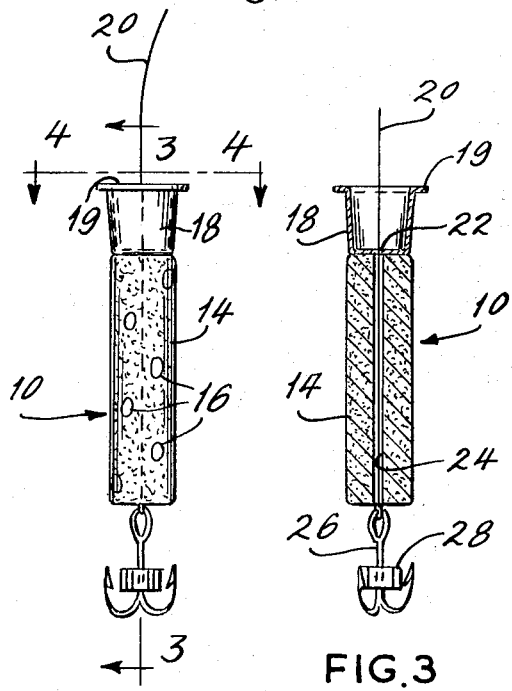
FIG. 2 is a side view showing one embodiment of the present lure construction.
FIG. 3 is a cross-sectional view taken on line 3—3 of FIG. 2.

The lure 10 in one of its preferred constructions includes an elongated body portion 14 which is shown as being cylindrical in shape. The body portion 14 is preferably constructed of some lightweight porous material such as porous polyethylene, styrofoam or the like, and the outer surface of the body 14 can be decorated in any suitable manner with a design which represents some creature, and the design can be painted or otherwise applied thereto. In FIG. 2, the body 14 is shown for illustrative purposes formed of a white plastic substance having spaced colored body dots 16 thereon. The body 14 is extremely lightweight and buoyant for its size so that it will float high on the water. The forward or head end of the body 14 has an attached hollow cup-shaped member 18 which has an outwardly extending annular flange 19 and can be constructed of an inexpensive plastic substance. The member 18 can be glued to the body 14 or it can be attached in other ways as will be explained. A length of fishing line such as plastic fishing line 20 extends through a hole 22 located at the center of the bottom wall of the cup-shaped member 18, and also extends lengthwise through the body portion 14 preferably along the axis thereof. A special hole 24 can be provided through the body 14 for this purpose or the line 20 can simply by forced or threaded through the body and through the cup-shaped member 18 using a needle or other suitable tool for this purpose. The end of the line 20 that extends from the rear end of the body, which is the opposite end from the cup-shaped member 18, is attached directly or by suitable well-known attachment means to a hook such as the conventional triple hook 26 as shown. A decorative ring or bead 28 may also be mounted on the shank portion of the hook 26, if desired. The end of the line 20 that extends from the cup-shaped member 18 at the front end of the lure may have any desired length depending on the desired distance to be maintained between the subject lure 10, which is sometimes referred to as a hitchhiker lure, and the heavier lure 12 with which it is used. This line length can be varied considerably depending on the casting skill of the fisherman, the condition of the wind, and the distance desired to be maintained between the two lures. The free forward end of the line 20 is connected to means such as a conventional snap fastener device 30 (FIG. 2) commonly used by fisherman to make an attachment between two members, such as between a line and lure. The attachment in this case will usually be to a rear eyelet on the heavier lure 12.

The lightweight buoyant construction of the present lure 10 enables it to move or skip over the surface of the water, and in so doing the annular flange 19 on the cup-shaped member 18 will cup the water and cause the lure to jerk along the surface, the action obtained depending to some extent on the speed at which the lure is moving. Also, if the open side of the cup-shaped member 18 faces forwardly as in the construction shown in FIGS. 2 and 3, the lure will also make a popping or popping-like noise as it cups the water and it is believed this noise is attractive to certain species of fish. If the cup-shaped member 18 is reversed on the body portion as illustrated in some of the other embodiments, such as those shown in FIGS. 5–7, this will have some effect on the action as it moves through or across the water but will not alter the basic jerky or insect-like action that is produced.

Figure 5:
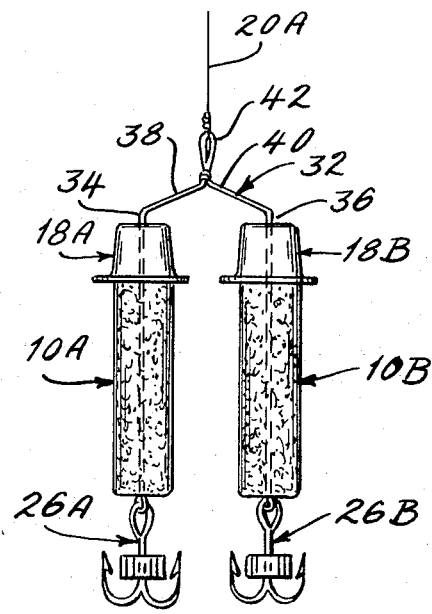
FIG. 5 is a view showing a modified tandem embodiment of the subject lure.
Figure 4:
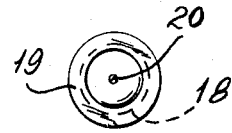
FIG. 4 is a view taken on line 4—4 of FIG. 2.
Figures 6, 7:
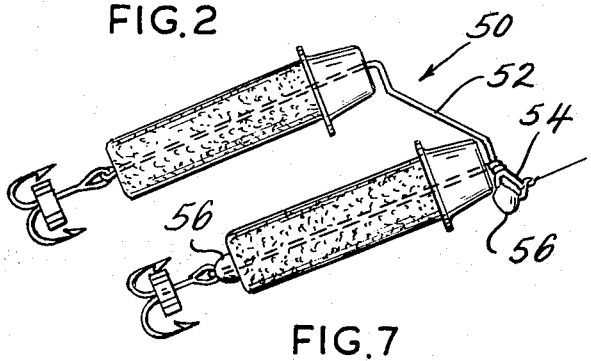
FIG. 6 is a side view of the modified lure of FIG. 5.
FIG. 7 shows another modified tandem embodiment of the subject lure construction.

FIGS. 5 and 6 show a modified embodiment of the subject lure in which two similarly constructed lure bodies 10A and 10B are connected together as a single lure by means of a relatively stiff formed wire member 32. The wire member 32 has first and second parallel portions 34 and 36 which extends lengthwise through the lure bodies 10A and 10B, respectively, each portion having at its rear end a loop portion for pivotal connection to a hook shown as three-barbed hook assemblies 26A and 26B. The forward ends of the wire portions 34 and 36 are connected by other wire portions 38 and 40 which extend forwardly and sidewardly therefrom and are connected together by a twisted wire loop portion 42 of the wire for attaching to a line 20A or other well-known kind of line fastener device. The line 20A has its opposite end connected to the rear end or hook eyelet on another preferably heavier lure. Except for the fact that the construction shown in FIGS. 5 and 6 has the stiff wire portion 32 and two instead of one body portion, it is similar and operates similarly to the construction shown in FIGS. 2–3. As already noted the cap portions 18A and 18B on the modified constructions of FIGS. 5–7 are shown reversed as compared to the construction described above, and therefore the modified construction will produce a somewhat different action when moving on or through the water. It is also possible in a two-body construction of the subject lure to have one cup-shaped member open forwardly as in the FIG. 2 construction and the other open rearwardly as in the constructions of FIGS. 5–7 to enable it to produce a still further action in the water.

The further modified embodiment 50 shown in FIG. 7 is quite similar to the embodiment of FIGS. 5 and 6 but differs therefrom in the shape of the wire member 52 as compared to the wire member 32, in the location of the loop 54 to which the line is attached, and in the fact that the construction 50 has one or more lead weights 56 attached to it to increase the weight of one or both portions thereof. The lead weights 56 are used to make the weighted portion move lower in the water and this also enables the modified lure 50 to be cast in some cases without even being used with another lure. However, it may also be used with another lure in the same way as previous constructions. This will depend on the type of casting equipment and the desired casting distance. Obviously, if a fisherman is merely going to troll he can use any of the subject lure embodiments with or without a second lure and with or without extra weight. Basically, however, the present lures are designed to ride high on the water and to land gently so as to produce a minimum of water disturbance which enables the present lure more nearly to act like certain types of water landing insects.

Thus there has been shown and described a novel lure construction which fulfills all of the objects and advantages sought therefor. It is apparent from what has been said, however, that many changes, modifications, variations and other uses are possible for the subject lure without departing from the spirit and scope of the present invention. All such changes, modifications, variations and other uses which do not depart from the spirit and scope of the invention are deemed to be covered by the invention which is limited only by the claims which follow.

What is claimed is:

1. A fish lure comprising a pair of similar lure portions each having an elongated body portion formed of a relatively lightweight highly buoyant substance means including a cup-shaped member attached to corresponding ends of each said body portions respectively, a hook located adjacent the opposite ends of each of said body portions, a formed relatively stiff wire member having spaced portions which extend respectively through the body portions, each of said spaced portions having one end connected to respective ones of said hooks, said cup-shaped member attached respectively to each of said body portions at the opposite ends thereof from said hooks, said wire member having a formed portion extending between the said spaced portions and between said cup-shaped member which includes a loop portion for attaching to a fishing line or the like.

2. The fish lure defined in claim 1 wherein said cup-shaped members are open on one side, the said cup-shaped members both facing in the same direction relative to the associated body portions.

3. The fish lure defined in claim 1 wherein said cup-shaped members are open on one side, said cup-shaped members being positioned to face in opposite directions relative to the associated body portions to which they are attached.

4. The fish lure defined in claim 1 including means on one of said lure portions to cause it to move lower in the water than the other lure portion.

5. The fish lure defined in claim 1 wherein the body portions are formed of a foamed plastic substance.

6. A fishing lure comprising a pair of substantially similar elongated body portions formed of substantially the same kind of plastic material, means connecting said body portions together and in substantially parallel spaced relationship, said means connecting said body portions including a single formed wire member having first and second parallel portions extending respectively through the similar elongated body portions, each of said first and second portions of the wire member having a free end formed into means for attaching a fish hook and an opposite end, said opposite ends being connected together by another formed portion of the wire member which includes means for attaching the lure to a fishing line.

7. A relatively lightweight fish lure constructed to simulate certain flying insects that light on water, said lure being constructed to be used with other heavier lures to achieve substantial casting distances therefor comprising two similar body portions each being constructed of a lightweight foamed plastic substance, a hook located at one side of each of said body portions and a cup-like member located at the opposite side of each of the body portions, and means extending through the body portions and through the cup-like members including means to maintain the body portions in predetermined spaced relation to each other and for connecting the lure to a heavier lure, said last named means including a predetermined length of fishing line which length controls the distance between the said lure and the heavier lure.

8. The fish lure defined in claim 7 wherein the means to maintain the body portions in spaced relation include a formed wire member having spaced connected portions which extend through the respective body portions.

* * * * *